United States Patent Office 3,184,332
Patented May 18, 1965

3,184,332
TEXTILE MATERIALS TREATED WITH A LINEAR POLYMERIC ESTER
Michael R. Rachinsky, East Rutherford, N.J., assignor to Hercules Powder Company, Wilmington, Del., a corporation of Delaware
No Drawing. Filed Mar. 1, 1963, Ser. No. 262,180
7 Claims. (Cl. 117—139.4)

This invention relates to textile fabrics having uniformly distributed therethrough linear polymeric esters and to the treatment of textile fabrics with linear polymeric esters to improve the properties thereof.

The incorporation of polymers into textile materials to impart such desirable properties as abrasive resistance, a soft hand, tear and/or tensile strength, or impermeability to certain solvents, is well known. However, the treated textile materials of the prior art all suffer certain disadvantages. Some fabrics, as for example those treated with natural rubber latex, have a rubbery hand, i.e., a rubbery feel when the fabric is handled. Other fabrics, such as those treated with polyvinyl acetate, polyvinyl chloride and certain copolymers of vinyl acetate and vinyl chloride have a papery hand, i.e., the fabric has a crisp, brittle feel and conveys the impression of thinness and fragility. In still other fabrics, the prior art treating compositions produce color, lack of strength, or are washed away by solvents. Still another disadvantage is the fact that some prior art polymeric treating agents are incompatible with conventional textile finishing agents.

It has now been found that textile fabrics having uniformly distributed therethrough a polymeric substance comprising at least 0.5% by weight (based on the fabric) of a linear polymeric ester having the following general formula:

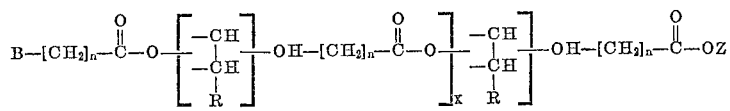

in which R is a substituent of the group consisting of hydrogen and alkyl radicals; $n$ is a whole number from 0 to 20, inclusive; $x$ is at least 1; B is a substitutent of the group consisting of

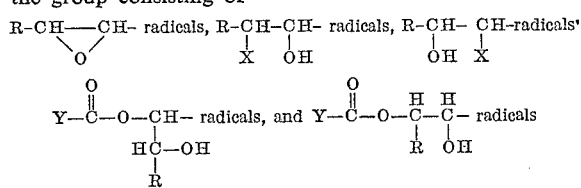

in which R has the same significance as set forth above, X is a halogen substituent, and Y is a substituent of the group consisting of hydrogen, straight and branched chain aliphatic hydrocarbon radicals,

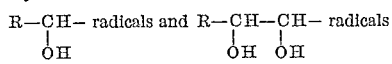

in which R has the same significance as set forth above; and Z is a substituent of the group consisting of hydrogen, hydroxyalkyl radicals, halohydroxyalkyl radicals, and alkali metal radicals exhibit a soft hand which cannot easily be washed away and are not discolored by household bleaches and detergents. The above-defined polymeric esters have a wide range of compatibility with other textile finishing agents and exhibit a synergistic effect with creaseproofing compositions to give a higher crease recovery angle than that obtainable with the creaseproofing composition alone.

The linear polymeric esters represented by the above formula are polyesters having a plurality of OH substituent groups attached at regular intervals along the polymer chain and which may or may not be end terminated. The most preferable polymeric esters are those having the following general formula:

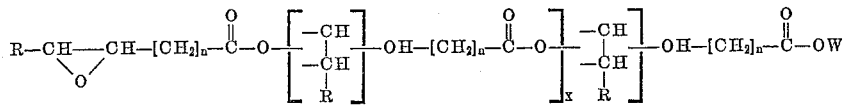 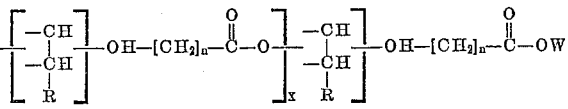

in which R is a substituent of the group consisting of hydrogen and alkyl radicals; $n$ is a whole number from 0 to 20, inclusive; $x$ is at least 1; and W is a substituent of the group consisting of hydrogen, hydroxyalkyl radicals and halohydroxyalkyl radicals.

The linear polymeric esters used in this invention are prepared by heating epoxyalkanoic acids or the alkali metal salts of halohydrated saturated aliphatic acids. Exemplary epoxyalkanoic acids are 2,3-epoxybutyric acid;
3,4-epoxybutyric acid;
2,3-epoxyhexanoic acid;
3,4-epoxyhexanoic acid;
5,6-epoxyhexanoic acid;
2,3-epoxyoctanoic acid;
5,6-epoxyoctanoic acid;
7,8-epoxyoctanoic acid;
2,3-epoxyundecanoic acid;
5,6-epoxyundecanoic acid;
10,11-epoxyundecanoic acid;
2,3-epoxyhexadecanoic acid;
7,8-epoxyhexadecanoic acid;
15,16-epoxyhexadecanoic acid;
2,3-epoxyoctadecanoic acid;
9,10-epoxyoctadecanoic acid;
10,11-epoxyoctadecanoic acid;
11,12-epoxyoctadecanoic acid;
12,13-epoxyoctadecanoic acid;
17,18-epoxyoctadecanoic acid; etc.

Exemplary halohydrated saturated aliphatic acids are

2(3)-chloro-3(2)-hydroxybutyric acid;
3(4)-bromo-4(3)-hydroxybutyric acid;
2(3)-iodo-3(2)-hydroxyhexanoic acid;
3(4)-chloro-4(3)-hydroxyhexanoic acid;
5(6)-chloro-6(5)-hydroxyoctanoic acid;
7(8)-bromo-8(7)-hydroxyoctanoic acid;
2(3)-chloro-3(2)-hydroxyhexadecanoic acid;
7(8)-iodo-8(7)-hydroxyhexadecanoic acid;
15(16)-chloro-16(15)-hydroxyhexadecanoic acid;
2(3)-chloro-3(2)-hydroxyoctadecanoic acid;
9(10)-chloro-10(9)-hydroxyoctadecanoic acid;
10(11)-chloro-11(10)-hydroxyoctadecanoic acid;
11(12)-chloro-12(11)-hydroxyoctadecanoic acid;
12(13)-chloro-13(12)-hydroxyoctadecanoic acid;
17(18)-bromo-18(17)-hydroxyoctadecanoic acid; etc.

The polymerization involves the reaction of epoxy or halohydrin substituent groups with carboxylic acid substituent groups of adjacent molecules to build up the linear polymeric ester structure, and can be conducted with or without a basic catalyst. In general, acids with internal epoxy groups react somewhat slower than acids having terminal epoxy groups. For example, 10,11-epoxyundecanoic acid starts polymerizing without a catalyst in solution at temperatures slightly above room temperature, whereas 9,10-epoxystearic acid requires temperatures in excess of 100° C. to start polymerizing. The polymerization of epoxyalkanoic acids is preferably conducted in the presence of a basic catalyst and at temperatures between about 75° C. and about 200° C. Suitable basic catalysts include by way of example, alkali metal oxides and hydroxides, alkali metal alcoholates, alkali metal salts of the epoxyalkanoic acid or acids being polymerized, as well as Lewis bases, such as triethylenediamine. These catalysts can be used in concentrations from about 0.01% to about 5% by weight, based on the weight of epoxyalkanoic acid.

A catalyst is neither necessary nor required when alkali metal salts of halohydrated saturated aliphatic acids are polymerized, heat alone being sufficient to effect polymerization at temperatures between about 75° C. and about 200° C.

The polymerization reaction is carried out until the desired degree of polymerization, i.e., the desired number of repeating units in the polymer, is attained. The course of the polymerization is readily followed by taking samples at intervals and analyzing for acid number, saponification number or oxirane oxygen content when an epoxyalkanoic acid is being polymerized and ester number when an alkali metal salt of a halohydrated saturated aliphatic acid is being polymerized.

The simplest means for controlling the degree of polymerization of these polymers is by just stopping the polymerization, i.e., discontinuing the heating of the reaction mixture when analysis indicates that the desired degree of polymerization has been reached. However, polymerization can also be controlled by adding "chain terminators" to the polymerization mixture. Various types of chain terminating agents can be used depending upon the specific polymerization being controlled. Monofunctional epoxides such as alkylene oxides and epihalohydrins, aliphatic acids, hydroxy aliphatic acids and dihydroxy aliphatic acids can be used when polymerizing epoxyalkanoic acids. The alkali metal salts of aliphatic acids, hydroxy aliphatic acids, and dihydroxy aliphatic acids can be used when polymerizing halohydrated alkanoic acids.

Any textile material can be treated with a polymeric composition containing a linear polymeric ester in accordance with the process of this invention. Exemplary of the various textile materials are those containing either natural or synthetic fibers, such as cellulose, wood, jute, sisal, ramie, hemp, manilla, wool, silk, and cotton, as well as fibers or filaments of rayon, those cellulose esters such as cellulose acetate, the polynosic rayon fibers such as that marketed under the trade name of Zantrel, vinyl resin fibers such as those of poly(vinyl chloride), copolymers of vinyl chloride with vinyl acetate, vinylidene chloride or acrylonitrile containing a major proportion of vinyl chloride in the polymer molecule and/or polyacrylonitrile with vinyl acetate, methacrylonitrile, vinyl pyridine, or mixtures of such comonomers and containing a major proportion of acrylonitrile in the copolymer molecule; also condensation polymers such as polyamides of the nylon type, polyesters such as poly(ethylene terephthalate), and the like.

The linear polymeric esters are preferably employed as aqueous dispersions; however, solutions of the polymers can also be used. The aqueous dispersions can be prepared by any of a number of procedures. One convenient procedure is to prepare a solution of the linear polymeric ester in an organic solvent and then form an emulsion by mixing with water and a small amount of surface active agent, i.e., the nonionic agents such as polyoxyethylene sorbitan monolaurate, methyl phenoxy-polyoxyethylene ethanol, polyoxyethylene lauryl alcohol, etc. The emulsions can then be stripped of the organic solvent or solvents by steam distillation to give a dilute dispersion which can be concentrated by further distillation or by other known methods if desired. Dispersions having various total solids composition can be prepared. In general, however, the latices will have a total solids content of at least about 0.5% by weight.

The textile material can be treated with the polymeric ester dispersion in a number of ways, for example, the material can be saturated by dipping or running a continuous belt of the material through a trough of the dispersion. The dispersion can also be applied to the material by spray, foam or knife-coating techniques. Still other methods of applying the dispersion will be apparent to those skilled in the art.

The amount of polymeric ester employed will embrace a wide range of proportions depending upon the specific textile material being treated, the specific polymeric ester being employed, and the properties desired in the finished fabric. In general, the amount of polymer employed in the treatment of the material will be sufficient to yield a fabric containing from about 0.5% to about 5.0%, more preferably from about 1.0% to about 2.0%, of the polymeric substance by weight. The amount of polymer in the fabric can also be expressed as percent add-on, which is the percent increase in the weight of the fabric due to the addition of the polymeric substance.

Various auxiliary modifiers, such as dyes, including the anionic dyes, pigments, fillers, water-miscible waxes, resins, shrinkproofing agents, creaseproofing agents, etc., can be employed as desired depending upon the use to which the product is to be put. The use of linear polymeric esters with creaseproofing compositions is particularly advantageous since a higher crease recovery angle is obtained than can be obtained with a creaseproofing composition alone. Examplary of the creaseproofing compositions which can be employed in accordance with this invention are melamine-formaldehyde resins, 1,3-bis[2 - (3 - hydroxymethyl-2-imidazolidinon-1-yl)ethyl]-1,3-bishydroxymethylurea, diepoxides, disulfones, dicarbamates, formaldehyde, methylolureas, etc. Obviously there are many cases in which an auxiliary modifier is not required or desired and excellent results are achieved without them.

If a creaseproofing or shrinkproofing agent is used, the treated fabric is generally heat treated to set the agent. This heat treatment can be accomplished in any suitable manner. A simple method is to remove excess aqueous dispersion by passing the material through nip rollers at about 20 p.s.i. and then dry and heat on a drum drier at a temperature of from about 140° C. to about 185° C.

The following examples are presented for purposes of illustration, parts and percentages being by weight unless otherwise specified.

EXAMPLE 1

This example illustrates the preparation of a linear polymeric ester of an epoxy alkanoic acid and its end termination.

A mixture of 575 parts by weight of 9,10-epoxystearic acid, of 78% purity, and 1.5 parts by weight of triethylenediamine was heated in a closed polymerization vessel in a nitrogen atmosphere at 180° C. for one hour, then 63.5 parts by weight of epichlorohydrin was injected into the reaction. After maintaining the mixture at a temperature of 150° C. for another hour, the excess epichlorohydrin was removed. The resulting product was a heavy oil having an acid number of 1.2, an ester number of 221.4 and a hydroxyl number of 167.1.

EXAMPLE 2

An aqueous dispersion was prepared from the polyester of Example 1 as follows: To a 10% solution of the polymeric ester in acetone was added 10% (based on the weight of the polymeric ester) of polyoxyethylene sorbitan monolaurate and 1 part of warm water per part of polyester. The emulsion was vigorously agitated and then the acetone was steam stripped to give a dispersion having a total solids content of 65%. The dispersion was diluted with water to a 1% total solids content and used to treat a sample of 80-square cotton broadcloth. The sample of broadcloth was saturated by dipping in the latex, put through a nip roll at 20 p.s.i. and air dried. The thus treated cloth was then dipped into a 6.8% aqueous solution of a commercial acetal creaseproofing resin containing 1% of magnesium chloride based on the weight of the resin. The sample was dried at room temperature and then cured for 1 minute on a drum drier at a temperature of 177° C. The thus treated cloth had a soft lasting hand. It had a 1% add-on by weight of the polymeric ester and a 6% add-on by weight of the acetal resin. After five launderings, the treated sample was tested and found to have a crease-recovery angle of 241°, a dry-warp tensile strength of 27 lbs. per inch and a dry-warp tear strength of 2.1 lbs. An untreated sample of the broadcloth had a crease-recovery angle of 170°.

EXAMPLE 3

An aqueous dispersion was prepared from a propylene oxide-terminated poly(9,10-epoxystearic acid) having an ester number of 188.6 and a hydroxyl number of 179.4 exactly as described in Example 2. The resulting concentrated dispersion was diluted with water to a 1% total solids content and sufficient commercial acetal creaseproofing resin was added to amount to 6% of the dispersion. A sample of 80-square cotton broadcloth was saturated by dipping in the dispersion, put through a nip roll at 20 p.s.i. and air dried. The sample was then cured for 2 minutes in a circulating air oven at a temperature of 177° C. The thus treated cloth had a soft lasting hand. After five launderings, the sample was tested and found to have a crease-recovery angle of 250°, a dry-warp tensile strength of 28 p.s.i. and a dry-warp tear strength of 2.2 lbs. An untreated sample of the broadcloth had a crease-recovery angle of 170°.

EXAMPLES 4–6

Three aqueous dispersions of polymeric esters were prepared following the method described in Example 2. In each dispersion 10% of surface active agent, based on the weight of the polymeric ester, was used. The polymeric esters and surface active agents used and the solids content of each dispersion is listed below.

EXAMPLE 4

*Polymeric ester.*—Poly(9,10-epoxystearic acid) having an acid number of 84.4, an ester number of 128 and a residual oxirane-oxygen content of 0.76%.
*Surface active agent.*—An alkyl phenoxypolyoxythylene ethanol, 59.5% total solids.

EXAMPLE 5

*Polymeric ester.*—Poly(9,10-epoxystearic acid) terminated with epichlorohydrin having an acid number of 1.2, an ester number of 221.4 and a hydroxyl number of 167.1.
*Surface active agent.*—A polyoxyethylene sorbitan monolaurate, 65% total solids.

EXAMPLE 6[1]

*Polymeric ester.*—Poly(9,10-epoxystearic acid) having an acid number of 44.
*Surface active agent.*—A polyoxyethylene lauryl alcohol, 61.1% total solids.

Each dispersion was diluted with water to a 1% total solids content and used to treat individual samples of 80-square cotton broadcloth. Each sample of cotton broadcloth was saturated by dipping in a dispersion, put through a nip roll at 20 p.s.i. and air dried. Each cloth was then dipped into a 10% solution of a commercial thermosetting, nitrogenous, cyclic methylol resin, precursor, creaseproofing agent containing 5% of ammonium sulfate based on the weight of the resin. Each sample was dried at room temperature, then cured for 1 minute on a drum drier at a temperature of 177° C. The thus treated samples possessed a soft hand and had not changed in color. The percent add-on of polymeric ester and creaseproofing agent and some properties of the treated samples and an untreated control sample are shown in Table I.

*Table I*

| Examples | Polymer Add-On, percent | Creaseproofing Agent Add-On, percent | Crease-recovery Angle, degrees | | Tensile, p.s.i. | | Trapezoid Tear, Lbs. dry |
|---|---|---|---|---|---|---|---|
| | | | Unwashed | After 5 washes | Dry | Wet | |
| 4 | 0.8 | 8 | 308 | 264 | 29 | 24 | 1.0 |
| 5 | 1.4 | 8 | 304 | 285 | 28 | 28 | 1.1 |
| 6 | 1.0 | 8 | 297 | 286 | 43 | 46 | 2.65 |
| Control | | | 170 | 170 | 46 | | 3.5 |

EXAMPLE 7

A sample of 80-square cotton broadcloth was treated with a dispersion of epichlorohydrin-terminated poly(9,10-epoxystearic acid) containing a commercial epoxy creaseproofing agent. The dispersion was exactly the same as the dispersion of Example 5, except for the addition of the different creaseproofing agent. A control solution of the creaseproofing agent alone was prepared. Individual samples of 80-square cotton broadcloth were dipped into the dispersion and control solution. Each sample was then put through a nip roll at 20 p.s.i. and air dried. The thus treated samples were cured for 3 minutes in an air circulating oven at a temperature at 163° C. The cloth sample treated with the dispersion containing epichlorohydrin-terminated polymer possessed a soft lasting hand while the sample treated with creaseproofing agent alone did not exhibit a soft hand.

EXAMPLE 8

A sample of 80-square cotton broadcloth was treated with a creaseproofing agent and the aqueous dispersion of Example 5 as follows: The cloth was first treated with an aqueous solution of 1,3-bis[2-(3-hydroxymethyl-2-imidazolidinon-1-yl)ethyl] - 1,3 - bis - hydroxymethylurea containing 5% ammonium sulfate based on the weight of the urea compound. The cloth was put through a nip roll at 20 p.s.i. and air dried. The percent add-on of urea creaseproofing agent was 8.4%. The cloth was then treated with the dispersion of Example 5, put through a nip roll at 20 p.s.i. and air dried. The percent add-on of epichlorohydrin - terminated poly(9,10 - epoxystearic acid) was 2.0%. The thus treated cloth was cured for 5 minutes in a circulating air oven at a temperature of 149° C. The treated cloth had a soft hand and a crease-recovery angle of 309°.

EXAMPLE 9

This example demonstrates the treatment of woolen blanket material with a shrinkproofing agent and aqueous dispersion of an epichlorohydrin-terminated poly(9,10-epoxystearic acid) having an acid number of 0.3, an ester number of 224.3 and a hydroxyl number of 69.5. The dispersion was prepared as described in Example 2. The dispersion was diluted with water to 2% total solids and sufficient epichlorohydrin-modified aminopolyamide resin was added to amount to 7% of the dispersion. A sample of the woolen material was dipped into the dispersion, put through a nip roll at 20 p.s.i. and air dried. The percent add-on of the epichlorohydrin-terminated polymeric ester was 2% and of the polyamide resin, 7%. The material was then cured for 75 minutes in a circulating air oven at a temperature of 149° C. The thus

---

[1] The pH of this dispersion was adjusted to 8.5 with ammonium hydroxide.

treated material possessed a soft lasting hand and was essentially shrinkproof.

EXAMPLE 10

A dispersion was prepared exactly as described in Example 9 and then diluted with water to 2% total solids. To the dilute dispersion was added sufficient epichlorohydrin-modified aminopolyamide resin to amount to 2% of the dispersion plus 0.04% sodium bisulfite based on the weight of the resin. The pH of the dispersion was then adjusted to 6.8 by the addition of sodium hydroxide. A sample of 16 oz. wool serge was dipped into the dispersion and put through a nip roll at 20 p.s.i. The treated cloth was then creased and pressed with a steam iron to dryness. The thus treated cloth possessed a soft lasting hand and a permanent crease. The cloth was tested by boiling in water for 1 hour and in perchloroethylene for 1 hour. It withstood the treatment with no perceivable change.

EXAMPLE 11

An aqueous dispersion was prepared from a nonterminated poly(9,10-epoxystearic acid) having an acid number of 75.3, and oxirane-oxygen content of 1.34% by weight and an equivalent weight of 286.5 exactly as described in Example 2. The resulting concentrated dispersion was diluted with water to a 1% total solids content. A sample of 80-square cotton broadcloth was saturated by dipping in the dispersion, put through a nip roll at 20 p.s.i., and air dried. The thus treated cloth had a soft hand even after repeated launderings.

EXAMPLE 12

An aqueous dispersion was prepared from a propylene oxide terminated poly(10,11-epoxyundecanoic acid) having an acid number of 1.5, an oxirane-oxygen content of 0.2% by weight and an ester number of 216 by the method described in Example 2 except that in place of the polyoxyethylene sorbitan monolaurate surface active agent was substituted polyoxyethylene lauryl alcohol. The resulting concentrated dispersion was diluted with water to a 1% total solids content and sufficient commercial acetal creaseproofing resin was added to amount to 6% of the dispersion. A sample of 80-square cotton broadcloth was saturated by dipping in the dispersion, put through a nip roll at 20 p.s.i. and air dried. The sample was then cured for 2 minutes in a circulating air oven at a temperature of 172° C. The thus treated cloth had a soft lasting hand. After five launderings, the sample was tested and found to have a crease-recovery angle of 275°. A control sample of the broadcloth treated with the creaseproofing agent alone had a crease-recovery angle of 204° after five launderings.

What I claim and desire to protect by Letters Patent is:

1. As an article of manufacture, a textile fabric having uniformly distributed therethrough a polymeric substance comprising at least 0.5% by weight (based on the fabric) of a linear polymeric ester having the general formula:

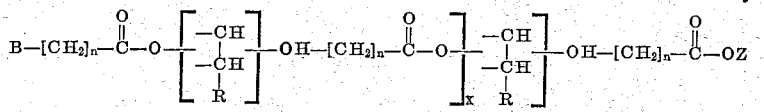

in which R is a substituent of the group consisting of hydrogen and alkyl radicals containing from 1 to 15 carbon atoms; $n$ is a whole number from 0 to 20, inclusive; $x$ is at least 1; B is a substituent of the group consisting of

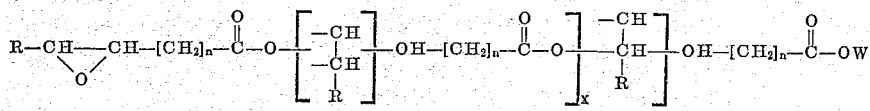

in which R has the same significance as set forth above, X is a halogen substituent, and Y is a substituent of the group consisting of hydrogen, straight and branched chain aliphatic hydrocarbon radicals containing from 1 to 15 carbon atoms, R—CH-radicals and R—CH—CH-radicals
     |                               |    |
     OH                             OH OH in which R has the same significance as set forth above; and Z is a substituent of the group consisting of hydrogen, hydroxyalkyl radicals containing from 1 to 15 carbon atoms, halohydroxyalkyl radicals containing from 1 to 15 carbon atoms, and alkali metal radicals.

2. As an article of manufacture, a textile fabric having uniformly distributed therethrough a polymeric substance comprising at least 0.5% by weight (based on the fabric) of a linear polymeric ester having the general formula:

$$R-CH\underset{O}{\overset{}{\diagdown}}CH-[CH_2]_n-\overset{O}{\overset{\|}{C}}-O-\left[\begin{array}{c}-CH\\|\\-CH\\|\\R\end{array}\right]-OH-[CH_2]_n-\overset{O}{\overset{\|}{C}}-O-\left[\begin{array}{c}-CH\\|\\CH\\|\\R\end{array}\right]_x-OH-[CH_2]_n-\overset{O}{\overset{\|}{C}}-OW$$

in which R is a substituent of the group consisting of hydrogen and alkyl radicals containing from 1 to 15 carbon atoms; $n$ is a whole number from 0 to 20, inclusive; $x$ is at least 1; and W is a substituent of the group consisting of hydrogen, hydroxyalkyl radicals containing from 1 to 15 carbon atoms and halohydroxyalkyl radicals containing from 1 to 15 carbon atoms.

3. An article of manufacture as in claim 2 wherein the linear polymeric ester is an ester of 9,10-epoxystearic acid.

4. An article of manufacture as in claim 2 wherein the linear polymeric ester is an epichlorohydrin-terminated ester of 9,10-epoxystearic acid.

5. An article of manufacture as in claim 2 wherein the linear polymeric ester is a propylene oxide-terminated ester of 9,10-epoxystearic acid.

6. An article of manufacture as in claim 2 wherein the polymeric substance is a mixture of poly(9,10-epoxystearic acid) and a creaseproofing agent selected from the group consisting of melamine-formaldehyde resins, 1,3 - bis[2 - (3 - hydroxymethyl - 2 - imidazolidinon - 1 - yl)ethyl] - 1,3 - bishydroxymethylurea, diepoxides, di - sulfones, dicarbamates, formaldehyde and methylolureas.

7. An article of manufacture as in claim 2 wherein the polymeric substance is a mixture of epichlorohydrin-terminated poly(9,10-epoxystearic acid) and a creaseproofing agent selected from the group consisting of melamine-formaldehyde resins, 1,3 - bis[2 - (3 - hydroxymethyl - 2 - imidazolidonin - 1 - yl)ethyl] - 1,3 - bishydroxymethyl - urea, diepoxides, disulfones, dicarbamates, formaldehyde and methylolureas.

References Cited by the Examiner
UNITED STATES PATENTS
2,567,237   9/63   Scanlan et al. _____ 260—348

WILLIAM D. MARTIN, *Primary Examiner.*
RICHARD D. NEVIUS, *Examiner.*

UNITED STATES PATENT OFFICE
CERTIFICATE OF CORRECTION

Patent No. 3,184,332                                                May 18, 1965

Michael R. Rachinsky

It is hereby certified that error appears in the above numbered patent requiring correction and that the said Letters Patent should read as corrected below.

Column 1, lines 42 to 47, the formula should appear as shown below instead of as in the patent:

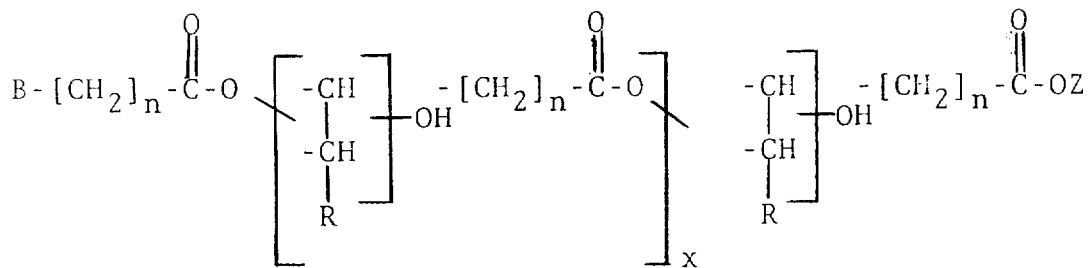

column 2, lines 12 to 15, the formula should appear as shown below instead of as in the patent:

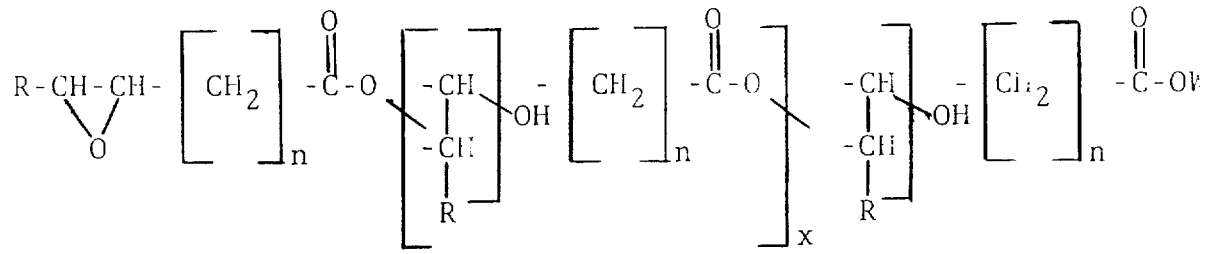

column 7, lines 65 to 70, the formula should appear as shown below instead of as in the patent:

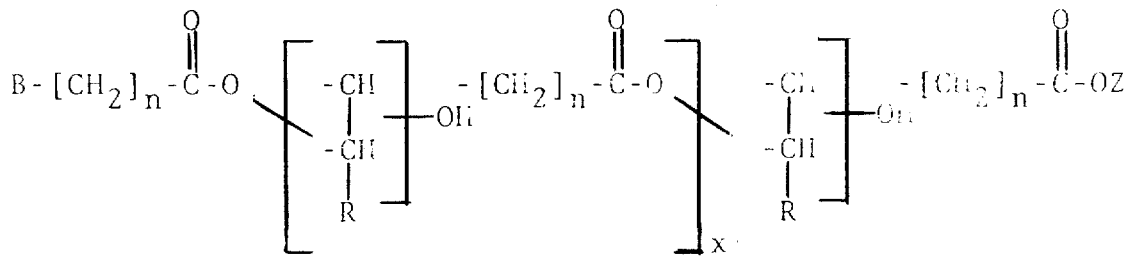

3,184,332 column 8, lines 5 to 7, the second formula should appear as shown below instead of as in the patent:

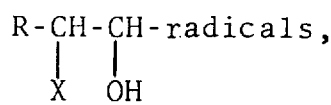

same column 8, lines 29 to 33, the formula should appear as shown below instead of as in the patent:

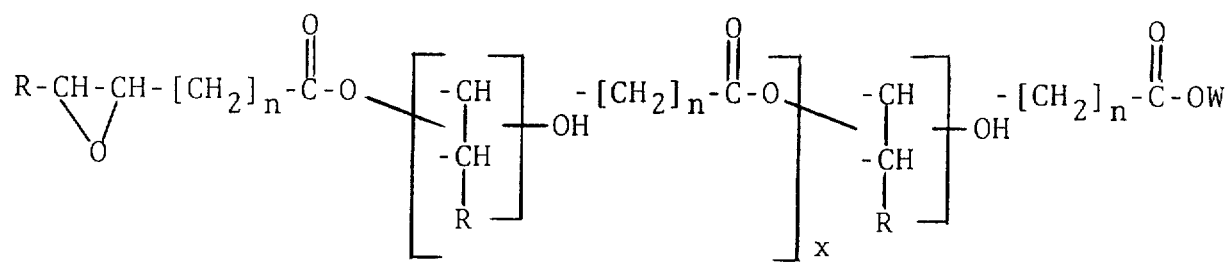

Signed and sealed this 7th day of December 1965.

(SEAL)
Attest:

ERNEST W. SWIDER
Attesting Officer

EDWARD J. BRENNER
Commissioner of Patents